United States Patent
Chen et al.

(10) Patent No.: US 10,331,169 B2
(45) Date of Patent: Jun. 25, 2019

(54) MODULARIZED HEAD-MOUNTED DISPLAY DEVICE, AND ASSEMBLY AND DISASSEMBLY MODULE

(71) Applicant: SHENZHEN ROYOLE TECHNOLOGIES CO. LTD., Shenzhen, Guangdong Province (CN)

(72) Inventors: Songya Chen, Guangdong (CN); Songling Yang, Guangdong (CN); Zihong Liu, Guangdong (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/561,671

(22) PCT Filed: Mar. 27, 2015

(86) PCT No.: PCT/CN2015/075322
§ 371 (c)(1),
(2) Date: Sep. 26, 2017

(87) PCT Pub. No.: WO2016/154827
PCT Pub. Date: Oct. 6, 2016

(65) Prior Publication Data
US 2018/0074549 A1 Mar. 15, 2018

(51) Int. Cl.
*G06F 1/16* (2006.01)
*G02B 27/00* (2006.01)
(Continued)

(52) U.S. Cl.
CPC .............. *G06F 1/163* (2013.01); *G02B 27/00* (2013.01); *G02B 27/01* (2013.01);
(Continued)

(58) Field of Classification Search
CPC ...... G06F 1/163; G06F 1/1633; G06F 1/1654; G06F 1/1684; G02B 27/01
See application file for complete search history.

(56) References Cited

U.S. PATENT DOCUMENTS

| 4,952,024 A | 8/1990 | Gale |
| 5,606,743 A * | 2/1997 | Vogt .................. H04B 1/086 |
| | | 16/228 |

(Continued)

FOREIGN PATENT DOCUMENTS

| CN | 104166239 A | 11/2004 |
| CN | 201477289 | 5/2010 |

(Continued)

OTHER PUBLICATIONS

International Search Report dated Dec. 12, 2015 from corresponding application No. PCT/CN2015/075322.

*Primary Examiner* — Binh B Tran
*Assistant Examiner* — Douglas R Burtner
(74) *Attorney, Agent, or Firm* — Hauptman Ham, LLP

(57) ABSTRACT

Disclosed are a modularized head-mounted display device and an assembly and disassembly module. The head-mounted display device may include a display apparatus to display and output multimedia signals, an earphone apparatus to output audio signals, a connecting mechanism to connect the display apparatus and the earphone apparatus, and an assembly and disassembly module to detachably connect the display apparatus or the earphone apparatus to the connecting mechanism. The connecting mechanism of the head-mounted display device may include an assembly and disassembly module, thereby realizing the modularization of the device.

14 Claims, 13 Drawing Sheets

(51) Int. Cl.
  *G02B 27/01* (2006.01)
  *G02B 27/26* (2006.01)
  *G02C 7/00* (2006.01)
(52) U.S. Cl.
  CPC ......... *G02B 27/0176* (2013.01); *G02B 27/26* (2013.01); *G02C 7/00* (2013.01); *G06F 1/1633* (2013.01); *G06F 1/1654* (2013.01); *G06F 1/1684* (2013.01)

(56) References Cited

U.S. PATENT DOCUMENTS

| | | | | |
|---|---|---|---|---|
| 5,880,773 | A * | 3/1999 | Suzuki | G02B 7/12 345/8 |
| 6,084,555 | A * | 7/2000 | Mizoguchi | G02B 7/12 345/8 |
| 6,421,031 | B1 * | 7/2002 | Ronzani | G02B 27/017 345/8 |
| 6,480,174 | B1 | 11/2002 | Kaufmann et al. | |
| 8,577,427 | B2 * | 11/2013 | Serota | G02B 27/017 345/8 |
| 10,021,474 | B2 * | 7/2018 | Abreu | G02C 3/003 |
| 10,042,168 | B2 * | 8/2018 | Yang | G02B 27/0176 |
| 2006/0132382 | A1 * | 6/2006 | Jannard | G02C 11/06 345/8 |
| 2009/0180194 | A1 * | 7/2009 | Yamaguchi | G02B 27/0172 359/630 |
| 2009/0243964 | A1 * | 10/2009 | Rottenkolber | G02B 27/0176 345/8 |
| 2011/0090135 | A1 * | 4/2011 | Tricoukes | G02B 27/0176 345/8 |
| 2012/0105740 | A1 * | 5/2012 | Jannard | G02C 9/04 348/794 |
| 2012/0249797 | A1 * | 10/2012 | Haddick | G06F 1/163 348/158 |
| 2014/0036127 | A1 * | 2/2014 | Pong | H04R 1/028 348/333.01 |
| 2015/0253574 | A1 * | 9/2015 | Thurber | G02B 27/0172 359/630 |
| 2018/0063626 | A1 * | 3/2018 | Pong | H04R 1/1066 |

FOREIGN PATENT DOCUMENTS

| | | |
|---|---|---|
| CN | 201477289 U | 5/2010 |
| CN | 202565448 U | 11/2012 |
| CN | 102843630 A | 12/2012 |
| CN | 102918443 | 2/2013 |
| CN | 102918443 A | 2/2013 |
| CN | 203641784 | 6/2014 |
| CN | 204014003 | 12/2014 |
| CN | 204014003 U | 12/2014 |
| EP | 0551781 A | 7/1993 |
| EP | 0551781 | 3/1997 |
| JP | 2005189622 A | 7/2005 |
| JP | 2007266870 A | 10/2007 |
| JP | 2013093808 | 5/2013 |

* cited by examiner

MODULARIZED HEAD-MOUNTED DISPLAY DEVICE, AND ASSEMBLY AND DISASSEMBLY MODULE

RELATED APPLICATIONS

The present application is a National Phase of International Application Number PCT/CN2015/075322, filed Mar. 27, 2015.

TECHNICAL FIELD

The present disclosure relates to connecting mechanisms, and particularly to a modularized head-mounted display device, and an assembly and disassembly module for realizing the modularization of the head-mounted display device.

BACKGROUND

A head-mounted display (HMD), using a near-eye display technology, magnifies an image on an ultramicro display screen through a set of optical systems (primarily precision optical lenses), projects the image on the retina, and further presents a large-screen image to eyes of an observer. Since the head-mounted display device is substantially similar to glasses in appearance, it is also vividly called as video glasses, thus, a product concept of portable family cinema is put forward.

Even though the head-mounted display device puts the take-along and portability concept of the "family cinema" into products, among existing products, an earphone apparatus and a display apparatus are combined, but due to the limitation of relative positions of the earphone apparatus and the display apparatus, the product has a fixed state and occupies a relatively big space, leading to limited portability.

On this basis, for the existing products, the portability of the head-mounted display device is improved by being wiredly connected with an in-ear earphone, but meanwhile the integrity product property is also reduced, at the same time, different requirements to the earphone apparatus cannot be met.

Besides, since the head-mounted display device includes two structures for realizing audio output and video output, but the two structures require to be simultaneously used, the use status of the product is singular.

SUMMARY

An object of the present disclosure is to provide a modularized head-mounted display device and an assembly and disassembly module, so as to solve the above problems existing in the related art.

The present disclosure provides a head-mounted display device which may include a display apparatus to display and output multimedia signals, an earphone apparatus to output audio signals, and a connecting mechanism to connect the display apparatus and the earphone apparatus. The display apparatus or the earphone apparatus may further include an assembly and disassembly element. The connecting mechanism may further include an assembly and disassembly module. The assembly and disassembly element of the display apparatus and/or the earphone apparatus can be detachably connected to the assembly and disassembly module.

The present disclosure further provides an assembly and disassembly module which may include a slide handle, a base, an elastic strip, and an assembly and disassembly element. The slide handle may include an operating portion and a driven portion. The base may define a slide groove and a connecting groove. The slide groove may include a slide groove space inside the base. The slide groove space extends to a slide groove opening defined on an outer surface of the base. The operating portion is disposed on the slide groove opening. The driven portion is disposed in the slide groove space, and the driven portion is driven by the operating portion to slide in the slide groove space. The connecting groove may include a connecting space extending along the slide groove and a positioning portion arranged in the connecting groove. The connecting space extends to a connecting groove opening defined on the outer surface of the base. The elastic strip is disposed in the slide groove and connected to the slide handle. The assembly and disassembly element may include a connecting portion housed in the connecting space, and a fixing portion arranged on the connecting portion to be assembled to the positioning portion.

The present disclosure further provides an assembly and disassembly module which may include elastic hooks, a compression threaded tube, a screwing nut, and a fixing base. The elastic hook may include a resilient strip main body, and a hook portion and an elastic support portion respectively located at two ends of the resilient strip main body. The compression threaded tube may include a first threaded wall of partition type. The screwing nut may include a second threaded wall operable to be screwed with the first threaded wall. The fixing base may define penetrating grooves and fixing grooves. The penetrating grooves correspond to the first threaded wall. The first threaded wall is connected, from one side of the fixing base, to the second threaded wall on the other side through the penetrating grooves. The fixing groove is arranged between adjacent penetrating grooves to house the elastic support portion.

The head-mounted display device provided in the embodiments of the present disclosure is provided with the assembly and disassembly module which is arranged on the connecting mechanism, thereby realizing the modularization of the device. The device can be conveniently disassembled and combined according to different utilization requirements, thereby extending diversified use statuses of the device, and providing the assembly and disassembly module for realizing rapid assembly and disassembly.

DETAILED DESCRIPTION

In order to make the objects, technical solutions, and advantages of the present disclosure clearer and more obvious, below the present disclosure is further described in detail in combination with the accompanying drawings and embodiments. It shall be understood that the specific embodiments described herein are merely used to illustrate the present disclosure but not to limit the present disclosure.

In the description of the present disclosure, it should be understood that terms such as "first" and "second" are merely for descriptive purpose, but should not be construed as indicating or implying relative importance or suggesting the number of the related technical features. Thus, a feature defined with "first" or "second" can explicitly or implicitly mean that one or more such features are included. In the description of the present disclosure, "a plurality of" or "multiple" means two or more unless otherwise defined clearly and specifically.

In the description of the present disclosure, it should be indicated that unless otherwise specified and defined, terms "mount", "joint", and "connect" should be understood in a broad sense, for example, the connection can be a fixed connection, a detachable connection, or an integrated connection; it can be a mechanical connection or an electrical connection or mutual communication; and it can be a direct connection or an indirect connection through an intermediate medium; and it also can be an inner communication between two elements or interaction between two elements. For a person ordinarily skilled in the art, specific meanings of the above-mentioned terms in the present disclosure can be understood according to specific circumstances.

The following disclosure provides many different implementations or examples for realizing different structures of the present disclosure. In order to simplify the disclosure of the present disclosure, parts and settings in particular examples are described below. Of course, they are merely examples and are not intended to limit the present disclosure. Besides, the present disclosure can make repeated reference to numerals and/or letters in different examples, while such repetition is for the purpose of simplification and clarity, without indicating the relationship between the various discussed implementations and/or settings. Furthermore, the present disclosure provides various examples of particular processes and materials, while a person ordinarily skilled in the art can realize the application of other processes and/or utilization of other materials.

Figure 1:
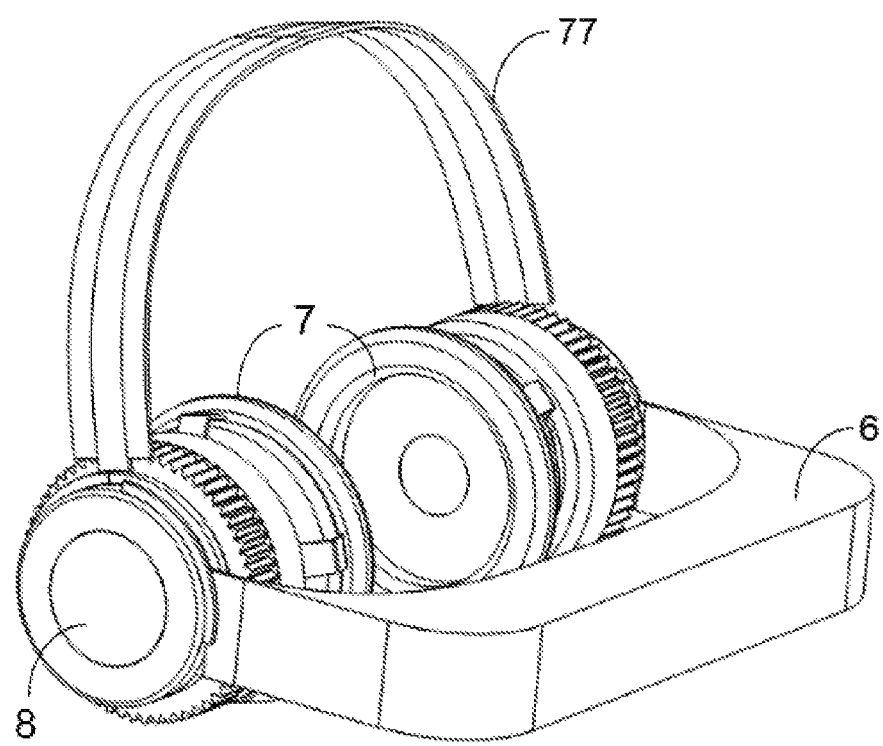
FIG. 1 is a structural schematic view of a head-mounted display device according to an embodiment of the present disclosure.

Referring to FIG. 1, FIG. 1 is a head-mounted display device provided in a preferred embodiment of the present disclosure. The device may include a display apparatus 6 to display and output multimedia signals, an earphone apparatus 7 to output audio signals, and a connecting mechanism 8 to connect the display apparatus 6 and the earphone apparatus 7. The display apparatus 6 or the earphone apparatus 7 may further include an assembly and disassembly element. The connecting mechanism 8 may further include an assembly and disassembly module. The assembly and disassembly element of the display apparatus 6 or the earphone apparatus 7 can be detachably connected to the assembly and disassembly module.

For the head-mounted display device provided in the present disclosure, by arranging the assembly and disassembly module on the connecting mechanism, the modularization of the device is realized. The device can be conveniently disassembled and combined according to different utilization requirements, thereby extending diversified use statuses of the device. Moreover, the modularized disassembling improves the portability of the product, and the space for carrying the device is effectively saved compared with head-mounted display devices having a fixed status.

Below the principle of the present disclosure will be illustrated with respect to different embodiments of the assembly and disassembly module and the assembly and disassembly element.

First Embodiment

Referring to FIG. 2 to FIG. 6, an assembly and disassembly module provided in a first embodiment of the present disclosure is provided. The module may include a slide handle 1, a base 2, an elastic strip 3, and an assembly and disassembly element 4. The slide handle 1 may include an operating portion 11 and a driven portion 12. The base 2 may be a part of either the display apparatus 6 or the earphone apparatus 7. The base 2 may define a slide groove 21 and a connecting groove 22. The slide groove 21 may include a slide groove space 211 inside the base 2. The slide groove space 211 extends to a slide groove opening 212 defined on an outer surface of the base 2. The operating portion 11 is disposed on the slide groove opening 212. The driven portion 12 is disposed in the slide groove space 211. The driven portion 12 is driven by the operating portion 11 to slide in the slide groove space 211. The connecting groove 22 may include a connecting space 221 extending along the slide groove 21, and a positioning portion 223 arranged in the connecting groove 22. The connecting space 221 extends to a connecting groove opening 222 defined on an outer surface of the base 2. The elastic strip 3 is disposed in the slide groove 21 and connected to the slide handle 1. The assembly and disassembly element 4 may be a part of either the display apparatus 6 or the earphone apparatus 7. The assembly and disassembly element 4 may include a connecting portion 41 housed in the connecting space 221, and a fixing portion 42 arranged on the connecting portion 41 to be assembled to the positioning portion 223.

Figure 3:
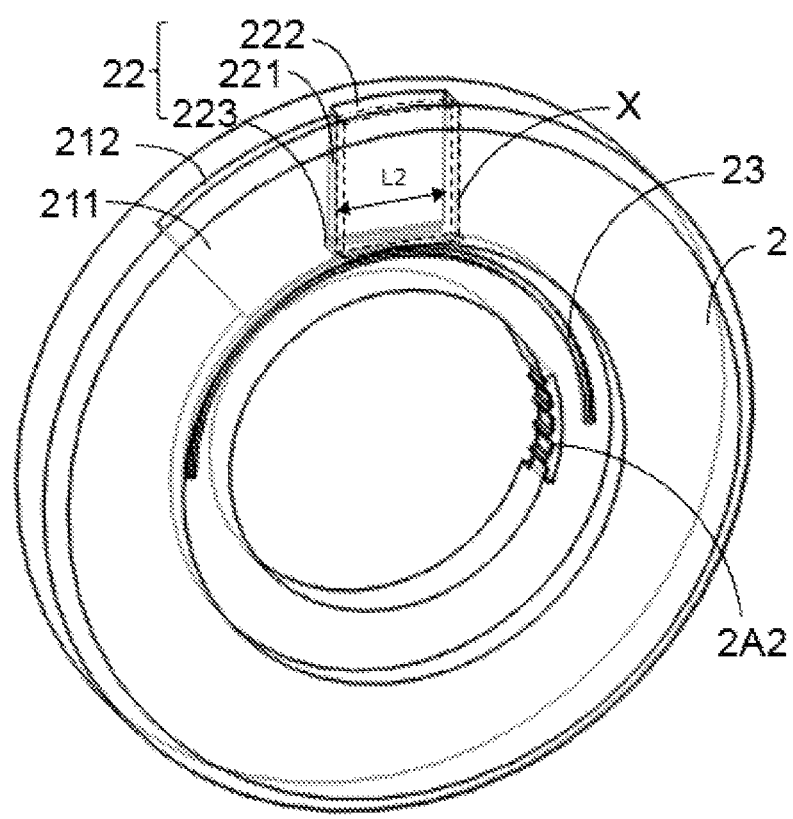
FIG. 3 is a structural perspective view of a base provided in the first implementation of the first embodiment of the present disclosure.

By operating the operating portion 11 of the slide handle 1 to slide in a left-right direction in FIG. 3, the driven portion 12 of the slide handle 1 can be driven to be located in the slide groove in a position where the driven portion 12 abuts against or does not abut against the assembly and disassembly element 4 (i.e., a position where the driven portion 12 is aligned with the connecting groove opening 22 or completely staggered with the connecting groove opening 222), which can realize that the fixing portion 42 of the assembly and disassembly element 4 is limited to the positioning portion 223 to achieve a fixed assembly state, and that the fixing portion 42 of the assembly and disassembly element 4 can be separated from the positioning portion 223 to achieve a detachable state.

The base 2 provided in the embodiment is of a ring shape, correspondingly, in order to be better adapted to this shape, the operating portion 11 of the slide handle 1 is of an arc shape corresponding to a radian of an outer surface of the ring, while the assembly and disassembly module of the present disclosure is not limited to this. The shape of the base 2 can be set according to the specific product shape. Correspondingly, in order to be better adapted to the shape of the base 2, the operating portion 11 of the slide handle 1 can be set to fit and overlap an outer surface of the slide groove opening 212 defined in the base 2.

Through this method, the assembly and disassembly of two assemblies can be realized conveniently and rapidly, and the application of the assembly and disassembly module can realize the modularization of the product.

Below the principle of the assembly and disassembly module will be further illustrated according to different implementations of the assembly and disassembly module provided in the first embodiment.

First Implementation

Figure 4:
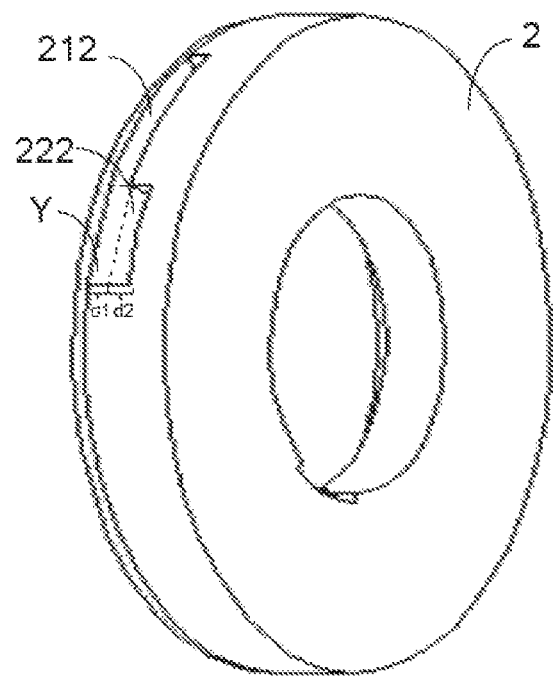
FIG. 4 is a structural schematic view of the base provided in the first implementation of the first embodiment of the present disclosure.
Figure 5:
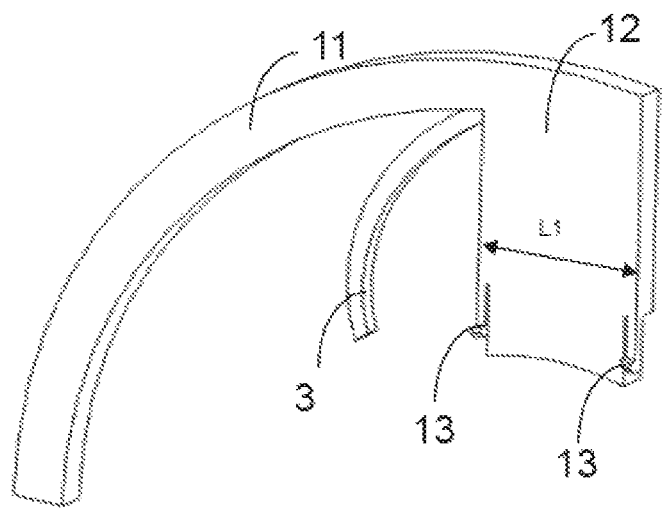
FIG. 5 is a structural schematic view of a slide handle and an elastic strip provided in the first implementation of the first embodiment of the present disclosure.
Figure 6:
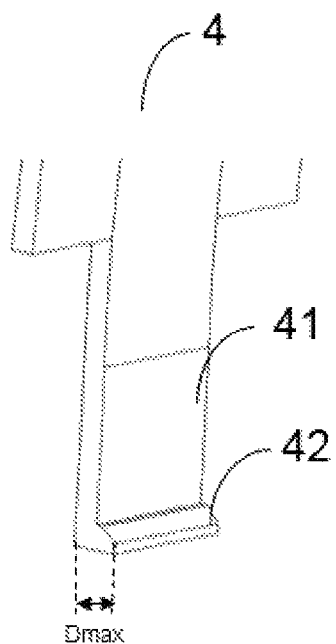
FIG. 6 is a structural schematic view of an assembly and disassembly element provided in the first implementation of the first embodiment of the present disclosure.

The connecting space 221 extends along a width direction of the slide groove 21. A direction (the left-right direction in FIG. 3) in which the slide handle 1 slides in the slide groove 21 is a length direction of the slide groove, correspondingly, a direction perpendicular to the length direction is a width direction (a left-right direction in FIG. 4) of the slide groove. As shown in FIG. 4-FIG. 6, an extending distance d2 of the connecting groove 22 along the width direction is smaller than a maximum width Dmax of the assembly and disassembly element 4. A sum d1+d2 of the extending distance d2 of the connecting groove 22 and the slide groove width d1 is larger than the maximum width Dmax of the assembly and disassembly element 4.

Figure 2:
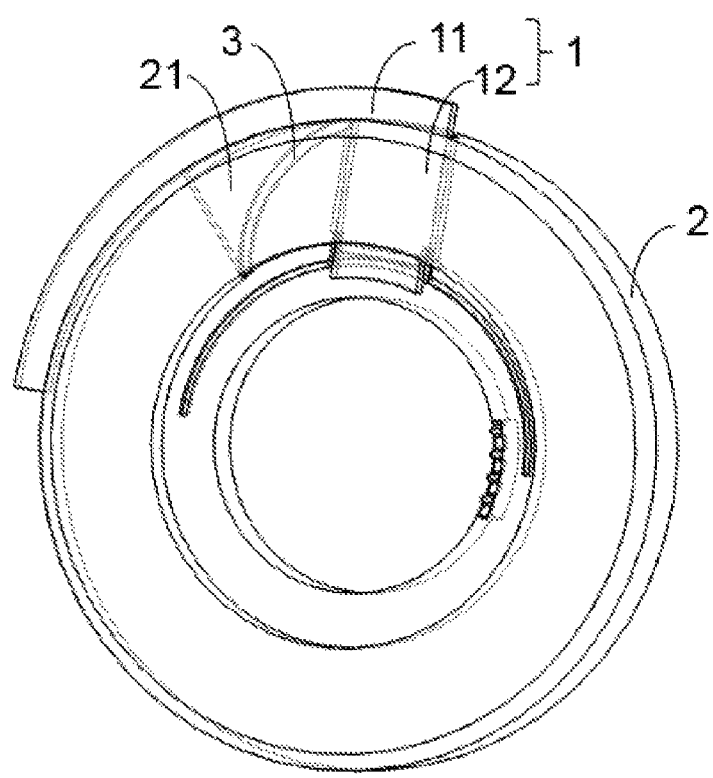
FIG. 2 is a structural schematic view of an assembly and disassembly module provided in a first implementation of the first embodiment of the present disclosure.

In installation, an acting force is applied to the operating portion 11 of the slide handle 1 in the length direction of the slide groove (a direction away from the connecting space 221), the driven portion 12 thus slides away from a slide groove space X (a space formed by dot lines in FIG. 3) of the slide groove space 211 juxtaposed with the connecting space 221. In the embodiment, the elastic strip 3 is extruded and deformed in the process that the slide handle 1 slides away from the slide groove space X, the connecting groove opening 222 and its corresponding slide groove opening Y (an area formed by dot lines in FIG. 4) form an installation opening, and the connecting space 221 and the slide groove space X form an installation space. At this point, the connecting portion 41 and the fixing portion 42 of the assembly and disassembly element 4 for engaging the base 2 can be disposed in the installation space through the installation opening. After the connecting portion 41 and the fixing portion 42 are disposed in the installation space and the fixing portion 42 is assembled to the positioning portion 223 of the base 2, the connecting portion 41 is received in the connecting space 221 so as to release the slide groove space X, at this point the driven portion 12 of the slide handle 1 returns to the slide groove space X under the effect of a resilience force generated by deformation of the elastic strip 3, and abuts against the connecting portion 41, thus limiting the fixing portion 42 to the positioning portion 223, thus the assembly and disassembly element 4 cannot be separated from the connecting space 221, realizing the fixed assembly, as shown in FIG. 2.

The positioning portion 223 in this implementation adopts a structure of limit slot (marked by a limit slot 223 in this embodiment): the limit slot 223 housing the fixing portion 42 is defined on a surface of the connecting space 221 opposite to the slide groove space X. In a preferred implementation, the extending distance d2 of the connecting groove 22 along the width direction is corresponding to the width of the connecting portion 41. "Corresponding to" means that the connecting space 221 just fittingly houses the connecting portion 41 therein, and after the fixing portion 42 is embedded into the limit slot 223, the driven portion 12 of the slide handle 1 returns to the slide groove space X to limit the connecting portion 41 to the connecting space 221, and to fix the fixing portion 42 to the limit slot 223, thereby realizing fixed engagement of the assembly and disassembly element 4 to the base 2. The embedment approach provided in the embodiment improves the product integrity after the assembly.

When the assembly and disassembly element 4 needs to be detached from the base 2, by applying an acting force to the operating portion 11 of the slide handle 1 in the length direction of the slide groove (a direction away from the connecting space 221), the driven portion 12 slides away from the slide groove space X corresponding to the connecting space 221, then the fixing portion 42 can be separated from the limit slot 223 through the installation space, and the connecting portion 11 and the fixing portion 42 can be taken out through the installation opening.

Figure 18:
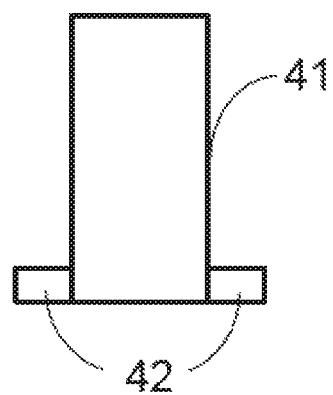
FIG. 18 is another structural schematic view of an assembly and disassembly element provided in the first implementation of the first embodiment of the present disclosure.

In other implementations, the fixing portion 42 may be a protruding structure extending from one side or two sides of the connecting portion 41 in the length direction, as shown in FIG. 18, correspondingly, the positioning portion 223 may be a recess defined corresponding to the protrusion arranged on one side or two sides of the connecting portion 41, i.e., a pair of side surfaces of the connecting space 221 in the length direction. The recess includes an opening communicating with the slide groove space 211. The assembly and disassembly element 4 can extend into the slide groove space X through the slide groove opening 212. When the protrusion is aligned with the opening, the assembly and disassembly element 4 can slide into the recess through the opening, so that the connecting portion 41 is disposed in the connecting space 221, then the slide groove space X is released. The slide handle 1 returns to the slide groove space X through the resilience force of the elastic strip 3, so that the connecting portion 41 is limited to the connecting space 221, and the protrusion is limited to the recess, thereby realizing the fixed assembly.

Preferably, as shown in FIG. 5, the driven portion 12 of the slide handle 1 is further provided with hooks 13, correspondingly, the slide groove space 211 is provided with slide tracks 23 corresponding to the hooks 13, so that the driven portion 12 will not escape from the slide groove 21 when sliding to the slide groove space X. Certainly, in other implementations, a length L1 of the driven portion 12 can be set to be larger than a length L2 of the connecting space 221, i.e., the driven portion 12 will not escape from the slide groove 21 to fall into the connecting space 221.

Second Implementation

Figure 7:
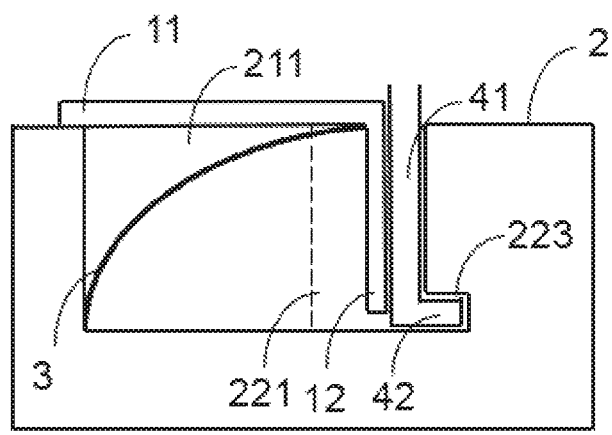
FIG. 7 is a sectional view of an assembly and disassembly module provided in a second implementation of the first embodiment of the present disclosure.
Figure 8:
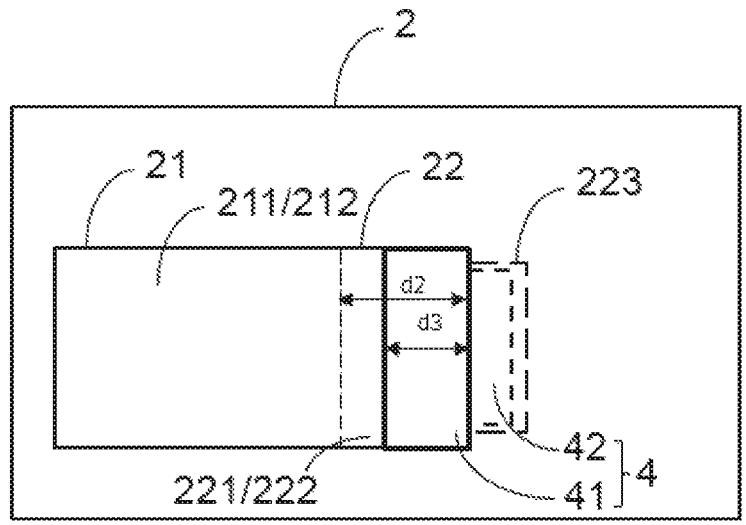
FIG. 8 is a top perspective view provided in the second implementation of the first embodiment of the present disclosure, showing a base and the assembly and disassembly module fixedly assembled.

The connecting space 221 further can expand along the length direction of the slide groove 21. The extending distance d2 of the connecting groove 22 is larger than or equal to the width d3 of the connecting portion 41. In the implementation, the elastic strip 3 provides a resilience force to return the slide handle 1 to the connecting groove 22, as shown in FIG. 7 and FIG. 8.

When an acting force is applied to the slide handle 1 in the length direction of the slide groove 21, the slide handle 1 slides away from the connecting groove 22, and the slide handle 1 causes the elastic strip 3 to deform during the slide-away process. The connecting portion 41 and the fixing portion 42 of the assembly and disassembly element 4 can be disposed in the connecting space 221 through the connecting groove opening 222. After the assembly and disassembly element 4 is disposed in the connecting space 221, the fixing portion 42 is assembled to the positioning portion 223 of the base 2, and a part of the connecting space, i.e., a space corresponding to d2-d3, is released, and the resilience force generated by the slide handle 1 due to the deformation of the elastic strip 3 causes the slide handle 1 to return to the released connecting space, so as to limit the fixing portion 42 to the positioning portion 223, thereby realizing the fixed assembly.

Figure 9:
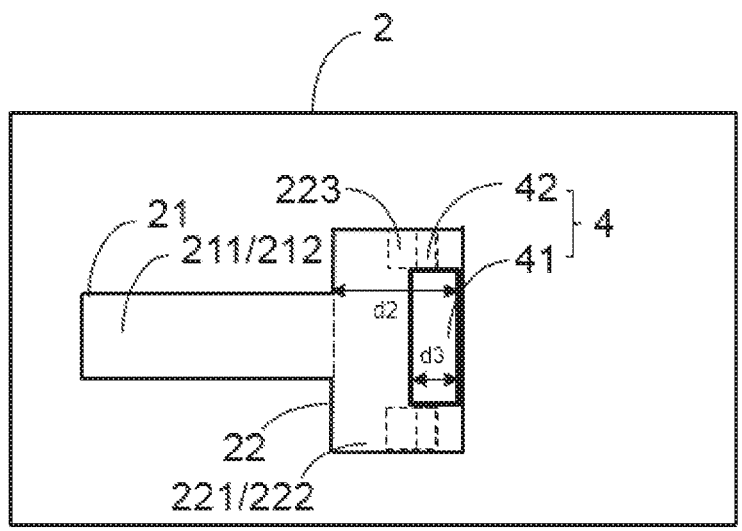
FIG. 9 is another top perspective view provided in the second implementation of the first embodiment of the present disclosure, showing a base and the assembly and disassembly module fixedly assembled.

Reference can be made according to the first implementation for the positioning portion 223 and the fixing portion 42 in this implementation. In cases where the limit slot 223 is used, the slide groove 21 and the connecting groove 22 form an integrated groove body, i.e., a top view of the slide groove 21 and the connecting groove 22 forms a shape resembling "I", as shown in FIG. 8. In this implementation, the extending distance d2 of the connecting groove 22 may be equal to the width d3 of the connecting portion. In cases where the protrusion and the recess are used, a top view of the slide groove 21 and the connecting groove 22 forms a shape resembling "T", as shown in FIG. 9. The fixing portion 42 of the assembly and disassembly element 4 is arranged on one side or two sides of the connecting portion 41 in the length direction, correspondingly, the connecting space 221 includes a space which is partially provided with the recess 223. The assembly and disassembly element 4 is disposed through a space where the recess 223 is not disposed. When the fixing portion 42 is aligned with the opening of the recess 223, the fixing portion slides into the recess 223 via the opening, the connecting portion 42 is embedded into the limit space confined by the recess 223, a part of the connecting space, i.e., a space corresponding to d2-d3, is released, and the resilience force generated by the elastic strip 3 due to the deformation of the elastic strip 3 causes the slide handle 1 to return to the released connecting space, so that the fixing portion 42 is limited to the positioning portion 223, thereby realizing the fixed assembly.

Third Implementation

Figure 10:
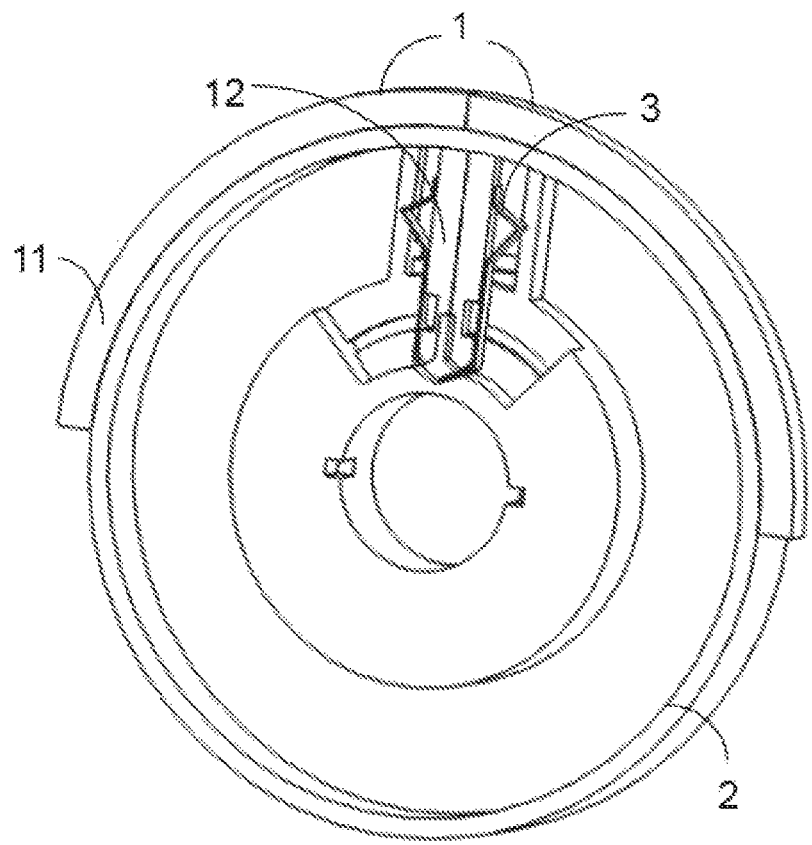
FIG. 10 is a structural schematic view of an assembly and disassembly module provided in a third implementation of the first embodiment of the present disclosure.
Figure 11:
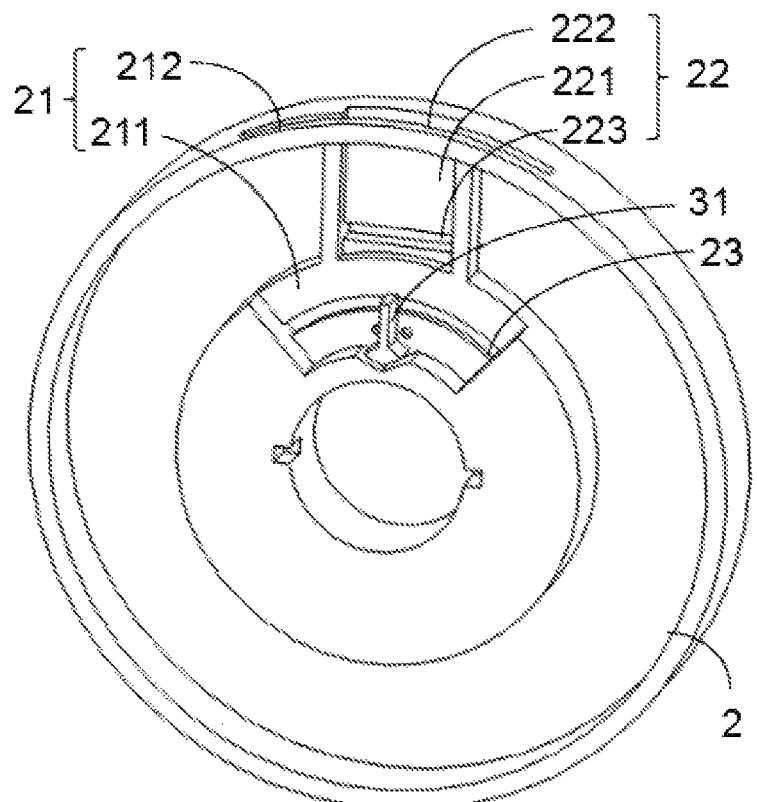
FIG. 11 is a structural schematic view of a base provided in the third implementation of the first embodiment of the present disclosure.
Figure 12:
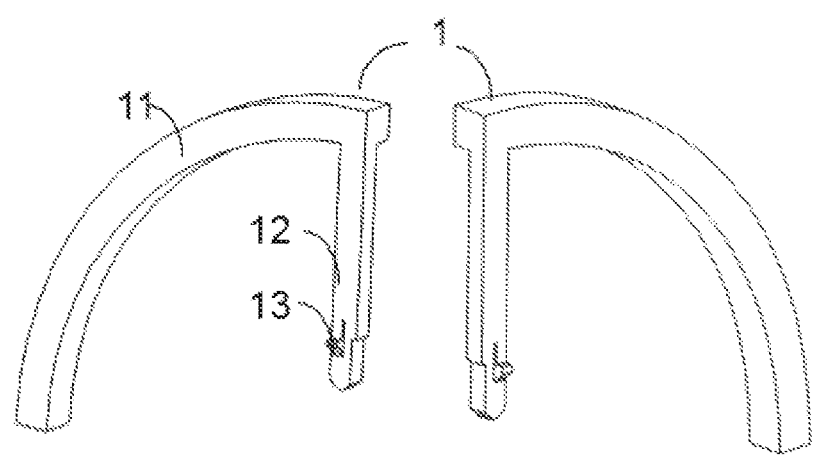
FIG. 12 is a structural schematic view of a slide handle provided in the third implementation of the first embodiment of the present disclosure.

Based on the principle of realizing the assembly that the slide handle 1 limits the fixing portion 42 to the positioning portion 223 due to the resilience force of the elastic strip 3, the implementation of the present disclosure may further include two slide handles, as shown in FIG. 10, FIG. 11, and FIG. 12.

Two slide handles 1 are arranged in the slide groove 21 in juxtaposition along the sliding direction of the slide groove 21. The slide handles 1 are slidable in the slide groove 21 in opposite directions to release a part of the slide groove. The connecting groove 22 is defined along the width direction of the released slide groove. The assembly and disassembly element 4 shown in FIG. 6 is taken as an example in this embodiment for illustration. Similar to the first implementation, the extending distance of the connecting groove 22 along the width direction is smaller than the maximum width Dmax of the assembly and disassembly element 4, and a sum of the extending distance of the connecting groove 22 and the slide groove width is larger than the maximum width Dmax of the assembly and disassembly element 4.

In this preferred implementation, it is acceptable that just one elastic strip 3 is provided, and two ends of the elastic strip 3 are respectively connected to the two slide handles 1. Specifically, a fixing seat 31 is arranged in the slide groove space 211, as shown in FIG. 11. The elastic strip 3 used in this example, resembling a "U" shape, includes two elastic arms and a bottom connecting the two elastic arms. The bottom is fixed to the fixing seat 31, and the two elastic arms each are respectively connected to one side surface of each of the two driven portions 12 perpendicular to the sliding direction, and the side surfaces are outer side surfaces along opposite sliding directions. The driven portions 12 are respectively arranged at ends of two operating portions 11 close to each other. In a preferred example, in an initial state, the two driven portions 12 fit each other in parallel in the slide groove, two ends of the elastic strip 3 are respectively connected to sides opposite to the sides of the driven portions 12 fitting with each other, that is, when no external force is applied to the slide handles 1, the two slide handles 1 enclose the slide groove 21 corresponding to the connecting groove 22. When a force is applied to separate the two slide handles 1, the elastic strip 3 is deformed, the two slide handles 1 are separated until an area of the slide groove 21 with the length sufficient to house the assembly and disassembly element 4 is released. Moreover, the area is corresponding to the connecting groove 22, that is, the connecting groove opening 222 and the slide groove opening 212 of the released area of the slide groove 21 form an installation opening, and the connecting space 221 and the slide groove space 211 of the released area of the slide groove 21 form an installation space. Since the sum of the extending distance of the connecting groove 22 and the slide groove width is larger than the maximum width Dmax of the assembly and disassembly element 4, the assembly and disassembly element 4 can be disposed in the installation space through the installation opening. When the fixing portion 42 of the assembly and disassembly element 4 is corresponding to the positioning portion 223 of the connecting groove 22 and housed therein, this corresponding area of the slide groove 21 is released, and the slide handles 1 return to the initial state under the resilience force of the elastic strip 3. At this point the assembly and disassembly element 4 can be limited to the connecting groove 22 since the extending distance of the connecting groove 22 along the width direction is smaller than the maximum width Dmax of the assembly and disassembly element 4.

Preferably, as shown in FIG. 12, the driven portion 12 of the slide handle 12 is further provided with the hooks 13, correspondingly, the slide groove space 121 is provided with the slide tracks 23 corresponding to the hooks 13, so that the driven portion 13 will not escape from the slide groove 21 when sliding to the area of the slide groove 21 corresponding to the connecting groove 22.

Second Embodiment

Figure 13:
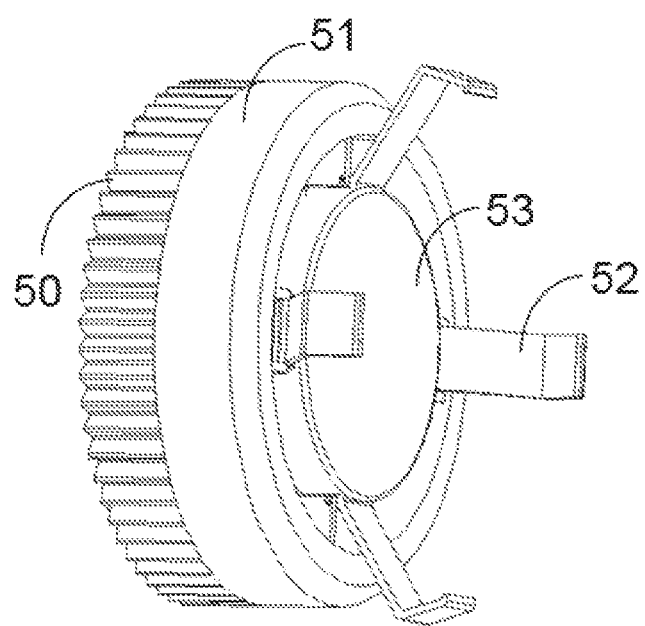
FIG. 13 is a structural schematic view of an assembly and disassembly module according to a second embodiment of the present disclosure.
Figure 14:
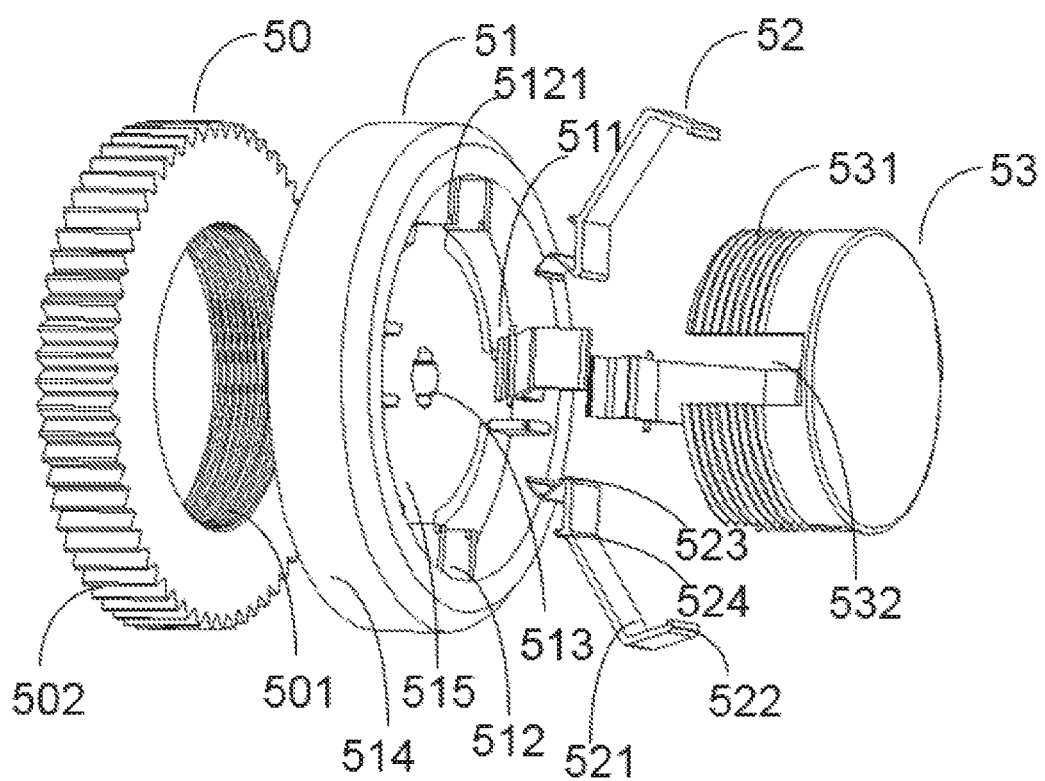
FIG. 14 is an exploded schematic view of the assembly and disassembly module provided in the second embodiment of the present disclosure.

A second embodiment of the present disclosure provides an assembly and disassembly module, as shown in FIG. 13 and FIG. 14. The module may include elastic hooks 52, a compression threaded tube 53, a screwing nut 50, and a fixing base 51. The elastic hook 52 includes a resilient strip main body 521, and a hook portion 522 and an elastic support portion 523 respectively arranged at two ends of the resilient strip main body 521. The compression threaded tube 53 includes a first threaded wall 531 of partition type. The screwing nut 50 includes a second threaded wall 501 operable to be screwed with the first threaded wall 531. The fixing base 51 defines penetrating grooves 511 and fixing grooves 512. The penetrating grooves 511 are corresponding to the first threaded wall 531. The first threaded wall 531 is connected, from one side of the fixing base 51, to the second threaded wall 501 on the other side through the penetrating grooves 511. The fixing grooves 512 are arranged between adjacent penetrating grooves 511 to house the elastic support portions 523.

Specifically, the fixing base 51 includes a frame 514 and a separating sheet 515 inside the frame 514. The fixing groove 512 may be a housing space established by two flat surfaces extending from a face of the separating sheet 515 towards the compression threaded tube 53, for housing the elastic support portion 523 in this space, correspondingly, the compression threaded tube 53 defines openings 532 each corresponding to the fixing groove 512, i.e., the compression threaded tube 53 can be snap-fitted to the fixing grooves 512, also the openings 532 enable the threaded wall of the compression threaded tube 53 to form into a separating type. When the separated first threaded wall 531 of the compression threaded tube 53 passes through the penetrating grooves 511 and is screwed to the second threaded wall 502 of the screwing nut 50, the elastic support portions 523 of the elastic hooks 52 are housed in the fixing grooves 512, the hook portions 522 extend to the outside of the compression threaded tube 53 through gaps left between the openings 532 and the fixing grooves 512, so that the hook portions 522 can be snap-fitted to a connecting element outside, such as a combining portion 71 of the earphone apparatus 7 of the head-mounted display device of the present disclosure. This combining portion 71, as the connecting element, is realized by steps which are operable to grasp the hook portions 522 and slots limiting the hook portions 522.

Preferably, a fixing shaft 524 is arranged between the resilient strip main body 521 and the elastic support portion 523 of the elastic hook 52, correspondingly, the fixing groove 512 further includes a shaft hole 5121 for fixing the fixing shaft 524.

The working principle of the assembly and disassembly module provided in the implementation is as follows.

When the screwed state of the screwing nut 50 and the compression threaded tube 53 causes that the hook portions 522 can be disposed in the combining portion of the earphone apparatus 7, the screwing nut 50 is rotated clockwise or anti-clockwise so that the screwing nut 50 and the compression threaded tube 53 get close to each other. In the rotating process, the compression threaded tube 53 moves axially in the penetrating grooves 511 defined in the fixing base 51. In the process of the axial movement towards the screwing nut 50, the bottom of the compression threaded tube 53 presses the elastic support portion 523 in the fixing groove 512 of the fixing base 51, and the elastic support portion 523 is rotated along the fixing shaft 524 after being pressed, at this point, the hook portion 522 is relatively retracted until the compression threaded tube 53 moves to press the elastic hook 52 to a position where the combining portion 71 of the earphone apparatus 7 is tightly clamped by the elastic hook 52, at this point the installation process of the earphone apparatus 7 is realized.

As for its disassembling process, it just needs to rotate the screwing nut 50 along a direction opposite to the previous installation direction, so that the screwing nut 50 and the compression threaded tube 53 get away from each other, that is, the compression threaded tube 53 moves outwardly along the axial direction, meanwhile, the hook portion 522 relatively opens under the effect of the elastic support portion 523, finally achieving an opening angle sufficient for taking out the combining portion 71 of the earphone apparatus 7.

Preferably, an outer annular surface of the screwing nut 50 defines anti-slide slots 502 for facilitating users' operation. It can be understood that the annular shape of the screwing nut 50 forms the operating portion and establishes the second threaded wall 501 inside the operating portion.

In this embodiment, the screwing nut 50 is of an annular shape, and the second threaded wall 501 is located on an inner annular surface, and the first threaded wall 531 of the compression threaded tube 53 is located on the outer surface. However, in other implementations, the screwing nut may include a square-shape or circular-shape operating portion and a cylindrical body extending from a center of the operating portion. The second threaded wall 501 is formed on an outer surface of the cylindrical body, correspondingly, the first threaded wall 531 of the compression threaded tube 53 is arranged on the inner surface.

Figure 15:
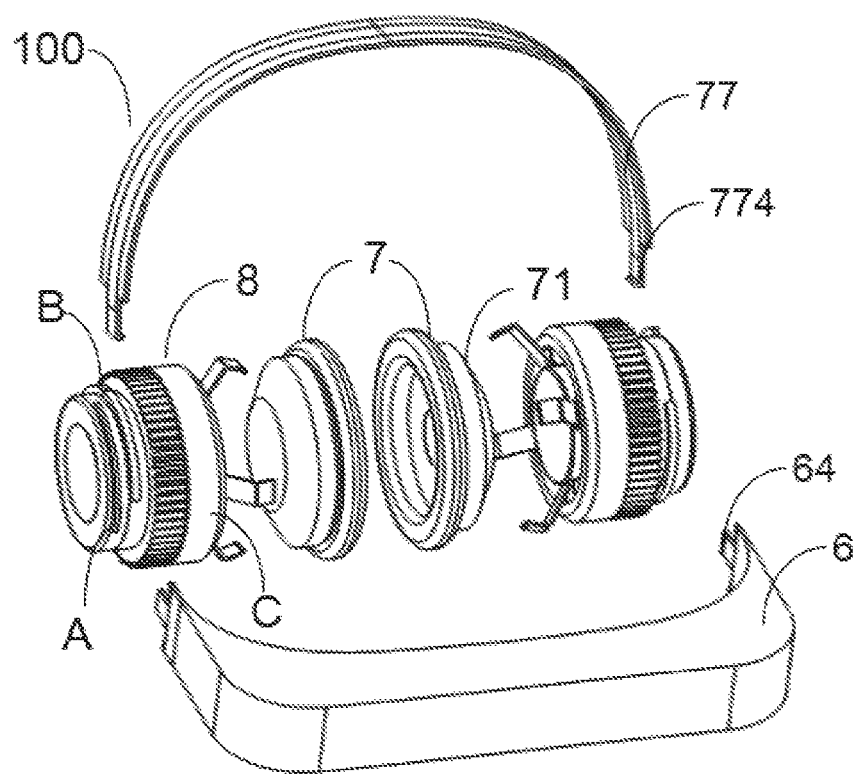
FIG. 15 is an exploded schematic view of a head-mounted display device according to a third embodiment of the present disclosure.
Figure 16:
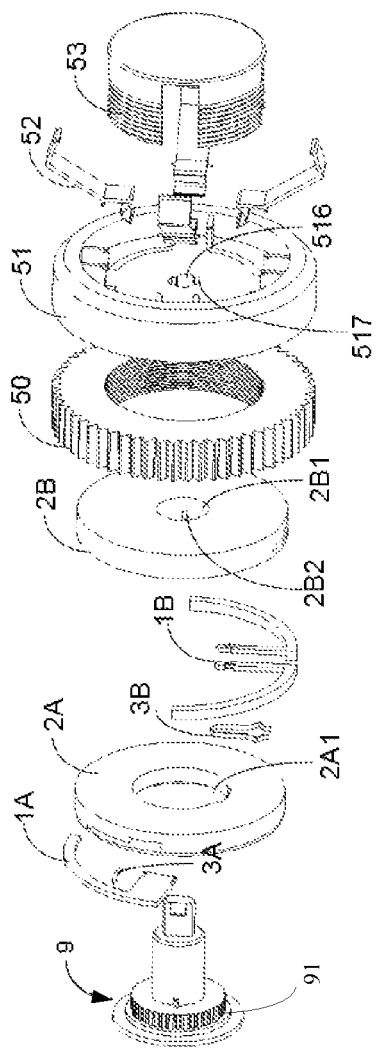
FIG. 16 is an exploded schematic view of a connecting mechanism according to the third embodiment of the present disclosure.

To sum up, for the head-mounted display device 100 provided in the preferred embodiments of the present disclosure, as shown in FIG. 15, its connecting mechanism 8 can use the combining manner as shown in FIG. 16. Two ends of the display apparatus 6 each are respectively connected to an assembly and disassembly element 64, and reference can be made according to the assembly and disassembly element 4 provided in the above embodiments for the assembly and disassembly element 64. It can be understood that the connection herein can be of an integrated structure and also can be of a separated assembling structure (same below). The display apparatus 6 is detachably connected to a module A of the connecting mechanism 8 through the assembly and disassembly element 64. The module A includes a slide handle 1A, an elastic strip 3A, and a base 2A, forming the assembly and disassembly module connected with the assembly and disassembly element 64. Reference can be made according to the first implementation of the first embodiment above for the structure and the principle, and will not be redundantly described herein. Preferably, the head-mounted display device 100 further includes a head-mounted bracket 77, and two ends of the head-mounted bracket 77 are respectively connected to an assembly and disassembly element 774. Reference can be made according to the assembly and disassembly element 4 provided in the above embodiment for the assembly and disassembly element 774. The head-mounted bracket 77 is detachably connected to a module B of the connecting mechanism 8 through the assembly and disassembly element 774. The module B includes a slide handle 1b, an elastic strip 3B, and a base 2B, forming the assembly and disassembly module connected with the assembly and disassembly element 774. Reference can be made according to the third implementation of the first embodiment above for the structure and the principle. The earphone apparatus 7 includes a combining portion 71 for connecting the connecting mechanism 8, and the detachability of the earphone apparatus 7 is realized through an assembly and disassembly module C. The assembly and disassembly module C includes the screwing nut 50, the fixing base 51, the elastic hooks 52, and the compression threaded tube 53. Reference can be made according to the second embodiment above for their structures and principles.

Figure 17:
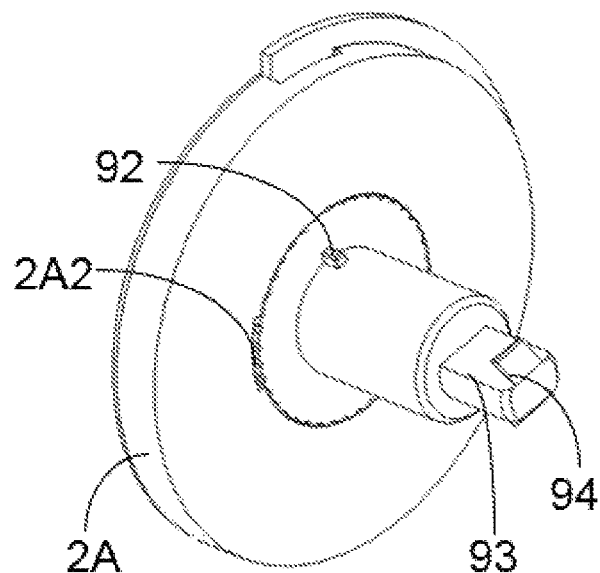
FIG. 17 is an installation schematic view of a base and a pin shaft according to the third embodiment of the present disclosure.

Preferably, the connecting mechanism 8 of the embodiment further includes a pin shaft 9 (reference can be made to FIG. 16 and FIG. 17), correspondingly, the base 2A and 2B define penetrating shaft holes 2A1 and 2B1. The pin shaft 9 is used to penetrate through the penetrating shaft holes 2A1 and 2B1 to be connected to the earphone apparatus 7.

Preferably, the pin shaft 9 includes a tooth-shape structure 91. An inner wall of the penetrating shaft hole 2A1 includes an engagement resilient strip 2A2 engaged with the tooth-shape structure 91, as shown in FIG. 3. The engagement resilient strip 2A2 is engaged with the tooth-shape structure on the pin shaft 9 to form a rotating structure with damping. Specifically, the pin shaft 9 further includes a limit portion 92. The limit portion 92 is a snap protrusion 92 corresponding to a snap recess 2B2 defined on an inner annular surface of the penetrating shaft hole 2B1 of the base 2B and is used to fix the base 2B. When the base 2A is rotated relative to the pin shaft 9, the base 2B is not rotated therewith, and this rotating structure can realize multi-angle adjustment of a wearing angle of the display apparatus 6, and also can be folded with the head-mounted bracket 77 for facilitating storage.

In this embodiment, the pin shaft 9 penetrating through the penetrating shaft holes 2A1 and 2B1 to be connected to the earphone apparatus 7 is specifically as follows: the pin shaft 9 further includes a rotating square shaft 93 and a stop hook 94. The axis center of the separating sheet 515 of the fixing base 51 defines a through hole 516 engaged with the rotating square shaft 93, and a clamping groove 517 correspondingly snapped with the stop hook. The clamping groove 517 extends partially along the through hole 516. The stop hook 94 is elastic and deformable, i.e., deformed and retracted as being limited and extruded when passing through the through hole 516. The stop hook 94, after passing through the through hole 516, restores a released state, and clamps to the clamping groove 517, thereby realizing the fixed assembly. Furthermore, the stop hook 94 is connected to the earphone apparatus 7 through the assembly and disassembly module.

The head-mounted display device 100 provided in the preferred embodiment provides diversified use choices to users. When the head-mounted bracket 77, the earphone apparatus 7, and the display apparatus 6 are respectively mounted to the connecting mechanism 8 through the assembly and disassembly modules B, C, and A, an immersion family cinema and so on can be realized. Certainly, the head-mounted bracket 77 may be not used in this mode. When it just needs to listen to the music, the display apparatus 6 can be removed through the assembly and disassembly module A. For favorites of different users, the head-mounted bracket 77 also can be personalized, and the earphone apparatus 7 is exchanged according personalization for different sound effect and sound quality requirements. In other implementations, the connecting mechanism 8 may not be provided with the assembly and disassembly module B, and is directly combined with the existing head-mounted earphone through the assembly and disassembly module C, that is, the head-mounted bracket is also provided.

In other implementations, the combination manners of the above assembly and disassembly modules can be flexibly arranged to realize personalized transformation of different products.

The above-mentioned descriptions are merely for preferable embodiments of the present disclosure and not used to limit the present disclosure. Any modifications, equivalent substitutions, improvements and so on, made within the spirit and principle of the present disclosure, shall be covered by the scope of protection of the present disclosure.

What is claimed is:

1. A head-mounted display device, comprising:
    a display apparatus operable to display and output multimedia signals;
    an earphone apparatus operable to output audio signals;
    a connecting mechanism operable to connect the display apparatus and the earphone apparatus,
    wherein, the display apparatus or the earphone apparatus further comprises an assembly and disassembly element, the connecting mechanism further comprises an assembly and disassembly module, and the assembly and disassembly element of the display apparatus or the earphone apparatus is detachably connected to the assembly and disassembly module;
    wherein, the assembly and disassembly module comprises a driven portion and a base defining a window;
    wherein, when the driven portion abuts against the assembly and disassembly element in the window, the assembly and disassembly element is fixed in the window without being removable from the window; and when the driven portion is separated from the assembly and disassembly element in the window, the assembly and disassembly element is removable from the window.

2. The head-mounted display device of claim 1, wherein the assembly and disassembly module comprises:
    a slide handle comprising an operating portion and the driven portion;
    the window comprising:
    a slide groove comprising a slide groove space inside the base, the slide groove space extending to a slide groove opening defined in an outer surface of the base, the operating portion being disposed in the slide groove opening, the driven portion being disposed in the slide groove space, and the driven portion being driven by the operating portion to slide in the slide groove space;
    a connecting groove comprising a connecting space extending along the slide groove and a positioning portion arranged in the connecting groove, the connecting space extending to a connecting groove opening defined in the outer surface of the base;
    the assembly and disassembly module further comprises an elastic strip, disposed in the slide groove and connected to the slide handle;
    the assembly and disassembly element comprises a connecting portion housed in the connecting space, and a fixing portion arranged on the connecting portion to be assembled to the positioning portion.

3. The head-mounted display device of claim 1 further comprising another assembly and disassembly element, wherein two ends of the display apparatus are respectively connected to the assembly and disassembly element and the another assembly and disassembly element.

4. The head-mounted display device of claim 3, further comprising a head-mounted bracket and another assembly and disassembly element, two ends of the head-mounted bracket being respectively connected to the assembly and disassembly element and the another assembly and disassembly element.

5. The head-mounted display device of claim 2, wherein the base defines a penetrating shaft hole, and the connecting mechanism further comprises:
   a pin shaft to penetrate through the penetrating shaft hole to be connected to the earphone apparatus.

6. The head-mounted display device of claim 1, wherein the assembly and disassembly module further comprises an operating portion operable to drive the driven portion to slide in the window.

7. The head-mounted display device of claim 6, wherein the assembly and disassembly module further comprises an elastic strip extending from a joint of the operating portion and the driven portion and arranged between the operating portion and the driven portion, and the elastic strip is operable to drive the driven portion to abut against the assembly and disassembly element in the window.

8. A head-mounted display device, comprising:
   a display apparatus operable to display and output multimedia signals;
   an earphone apparatus operable to output audio signals;
   a connecting mechanism operable to connect the display apparatus and the earphone apparatus;
   wherein, the display apparatus or the earphone apparatus further comprises an assembly and disassembly element, the connecting mechanism further comprises an assembly and disassembly module, and the assembly and disassembly element of the display apparatus or the earphone apparatus is detachably connected to the assembly and disassembly module;
   wherein the assembly and disassembly module comprises:
      a slide handle comprising an operating portion and a driven portion;
      a base comprising:
         a slide groove comprising a slide groove space inside the base, the slide groove space extending to a slide groove opening defined in an outer surface of the base, the operating portion being disposed in the slide groove opening, the driven portion being disposed in the slide groove space, and the driven portion being driven by the operating portion to slide in the slide groove space;
         a connecting groove comprising a connecting space extending along the slide groove and a positioning portion arranged in the connecting groove, the connecting space extending to a connecting groove opening defined in the outer surface of the base; and
         an elastic strip, disposed in the slide groove and connected to the slide handle;
      wherein the base further defines a penetrating shaft hole, and the connecting mechanism further comprises:
         a pin shaft to penetrate through the penetrating shaft hole to be connected to the earphone apparatus;
         wherein, the assembly and disassembly element comprises a connecting portion housed in the connecting space, and a fixing portion arranged on the connecting portion to be assembled to the positioning portion.

9. The head-mounted display device of claim 8, further comprising another assembly and disassembly element, wherein two ends of the display apparatus are respectively connected to the assembly and disassembly element and the another assembly and disassembly element.

10. The head-mounted display device of claim 9, further comprising a head-mounted bracket and another assembly and disassembly element, two ends of the head-mounted bracket being respectively connected to the assembly and disassembly element and the another assembly and disassembly element.

11. A head-mounted display device, comprising:
   a display apparatus operable to display and output multimedia signals;
   an earphone apparatus operable to output audio signals;
   a connecting mechanism operable to connect the display apparatus and the earphone apparatus,
   wherein, the display apparatus or the earphone apparatus further comprises an assembly and disassembly element, the connecting mechanism further comprises an assembly and disassembly module, and the assembly and disassembly element of the display apparatus or the earphone apparatus is detachably connected to the assembly and disassembly module;
   wherein the assembly and disassembly module comprises:
      a slide handle comprising an operating portion and a driven portion;
      a base comprising:
         a slide groove comprising a slide groove space inside the base, the slide groove space extending to a slide groove opening defined in an outer surface of the base, the operating portion being disposed in the slide groove opening, the driven portion being disposed in the slide groove space, and the driven portion being driven by the operating portion to slide in the slide groove space;
         a connecting groove comprising a connecting space extending along the slide groove and a positioning portion arranged in the connecting groove, the connecting space extending to a connecting groove opening defined in the outer surface of the base; and
         an elastic strip extending from a joint of the operating portion and the driven portion and arranged between the operating portion and the driven portion, and disposed in the slide groove;
      wherein, the assembly and disassembly element comprises a connecting portion housed in the connecting space, and a fixing portion arranged on the connecting portion to be assembled to the positioning portion.

12. The head-mounted display device of claim 11, further comprising another assembly and disassembly element, wherein two ends of the display apparatus are respectively connected to the assembly and disassembly element and the another assembly and disassembly element.

13. The head-mounted display device of claim 12, further comprising a head-mounted bracket and another assembly and disassembly element, two ends of the head-mounted bracket being respectively connected to the assembly and disassembly element and the another assembly and disassembly element.

14. The head-mounted display device of claim 11, wherein the base defines a penetrating shaft hole, and the connecting mechanism further comprises:
   a pin shaft to penetrate through the penetrating shaft hole to be connected to the earphone apparatus.

* * * * *